United States Patent [19]

Bake et al.

[11] Patent Number: 5,288,054

[45] Date of Patent: Feb. 22, 1994

[54] GLOBE VALVE AND METHOD FOR MAKING SAME

[75] Inventors: Earl A. Bake, Cary; Leonard J. Stephens, Raleigh, both of N.C.

[73] Assignee: M&FC Holding Company, Inc., Wilmington, Del.

[21] Appl. No.: 84,541

[22] Filed: Jun. 28, 1993

[51] Int. Cl.⁵ .............................................. F16K 1/00
[52] U.S. Cl. .................................... 251/171; 251/174
[58] Field of Search ................ 251/170, 171, 172, 174

[56] References Cited

U.S. PATENT DOCUMENTS

| | | | |
|---|---|---|---|
| 2,151,442 | 3/1939 | Roberts et al. | 251/172 |
| 2,866,477 | 12/1958 | Bredschneider | 251/174 X |
| 3,235,224 | 2/1966 | Grove | 251/174 |
| 3,327,991 | 6/1967 | Wallace | 251/172 |
| 3,583,426 | 6/1971 | Feres | 251/174 X |
| 3,883,112 | 5/1975 | Millville et al. | 251/174 |
| 3,918,681 | 11/1975 | Eberhardt | 251/172 X |
| 4,258,900 | 3/1981 | Kindersley | 251/172 |
| 4,280,522 | 7/1981 | Pechnyo et al. | 137/72 |
| 4,457,491 | 7/1984 | Dudman | 251/317 |
| 4,818,469 | 4/1989 | Supik | 376/203 |

Primary Examiner—John C. Fox
Attorney, Agent, or Firm—Lorusso & Loud

[57] ABSTRACT

A valve is presented comprising a valve body defining a chamber, a valve stem extending into said chamber, a disk attached to the valve stem, a discrete annular seat movably disposed in the chamber, a resilient ring disposed in the chamber adjacent the annular seat, and a retainer fixed in the chamber on a side of the seat opposite from the ring, wherein the ring exercises a bias on the seat in a direction toward the disk, urging the seat into engagement with the disk. The invention further contemplates a method for making the valve.

24 Claims, 3 Drawing Sheets

GLOBE VALVE AND METHOD FOR MAKING SAME

BACKGROUND OF THE INVENTION

1. Field of the Invention

The invention relates to globe valves and is directed more particularly to a globe valve for high pressure power plant drain service, providing improved seat sealing and longer valve life.

2. Description of the Prior Art

High pressure drain valves in power plants operate under very severe conditions. The valves are subject to high pressure blowdown of steam that often is abrasive because of the presence in the steam of moisture droplets and solid particulates. Further, the valves operate with fluid medium typically of very high temperatures, on the order of 660° F. in the case of saturated steam and 1020° F. in the case of superheated stream. Pressures of 2300 psig, or thereabouts, are common, and pressures of 3800 psig, or more, are encountered in some super critical steam power plants. Such valves historically have been forged steel globe valves with integral hard-faced metal seats. In the operation of such valves, extreme variations in temperature often lead to "cooling" of the disk and valve stem, resulting in contraction of the stem. Such contraction often causes the disk to part from the seat, permitting fluid to bleed through the valve.

Further, in high temperature service, stress-relaxation of stems in closed valves may produce a loss of stem compression and similar bleeding past the seat.

Still further, when the seating surfaces have become damaged over time, the valves have simply been replaced. Periodic replacement of such valves generally has been an accepted requirement by high pressure steam power plant operators.

More recently, there have appeared globe valves having replaceable metal or ceramic disks and seats. However, experience has shown that replacement of an original disk and seat assembly with a new disk and seat assembly sometimes leads to diminution of sealing performance.

Accordingly, there is a need for a globe valve for use in high pressure steam power plant drain environments, which valves are provided with a facility for providing in the disk and seat, close and secure sealing, even with thermal contraction or stress relaxation of the valve stem. A further need exists for such valves having improved disks and seats, the disks and seats being formed of harder, more durable, metals or ceramics separately from the valve, and inserted into the valve during initial assembly, all in an economical manner. A still further need is for a globe valve as described above, the valve being adapted to receive replacement disks and seats, with the sealing performance of replacement disks and seats equaling the sealing performance of the original disk and seat.

SUMMARY OF THE INVENTION

An object of the invention is, therefore, to provide a globe valve suitable for use in high pressure steam drain environments and having facility for insuring close and secure sealing performances, in the event of thermal contraction, or stress relaxation, of the valve stem.

A further object of the invention is to provide such a globe valve in which there are provided harder and more durable disk and seat assemblies.

A still further object of the invention is to provide a valve having replaceable disk and seat assemblies, wherein the replaceable assemblies provide a sealing performance comparable to the sealing performance of the original disk and seat.

A still further object is to provide such a globe valve which may be assembled in an economical manner so as not to force an undue cost premium over the traditional valves with integral hard-faced metal seats.

A still further object is to provide a method for making a globe valve having the improvements above described.

With the above and other objects in view, as will hereinafter appear, a feature of the present invention is the provision of a valve comprising a body defining a chamber, a valve stem extending into said chamber, a disk attached to the valve stem, a discrete annular seat movably disposed in the chamber, a resilient ring disposed in the chamber adjacent the annular seat, and a retainer fixed in the chamber on a side of the seat opposite from the ring, wherein the resilient ring exercises a bias on the seat in a direction toward the disk, urging the seat into engagement with the disk.

In accordance with a further feature of the invention, there is provided a valve as described immediately above, wherein the discrete annular seat includes a surface exposed to fluid flowing to the valve, the seat being biased by the pressure of the fluid in the direction toward the disk, urging the seat into engagement with the disk.

In accordance with a still further feature of the invention, there is provided a method for making a globe valve, the method comprising the steps of providing a valve body having an inlet conduit, a valve chamber, and an outlet conduit, the valve chamber having a shelf-like surface; placing a resilient ring on the shelf-like surface, providing a discrete annular valve seat of hard erosion-resistant material, placing the annular seat on the resilient ring with the seat contacting an internal wall of the chamber both upstream and downstream of the resilient ring, the seat having an annular conical surface inclining outwardly in a direction from upstream to downstream, the seat having a surface exposed to the inlet conduit, applying a load on the seat, and thereby the resilient ring, to move the seat upstream in the chamber and compress the resilient ring, fixing a retainer in the chamber on the downstream side of the seat at a distance from the seat sufficient to permit the resilient ring to regain a substantial part of its non-compressed state before the seat moves into engagement with the retainer, inserting through an open end of the chamber a disk and valve stem into the chamber, the disk having an annular conical surface engageable with the seat annular conical surface, and closing off the chamber open end.

The above and other features of the invention, including various novel details of construction and combinations of parts, will now be more particularly described with reference to the accompanying drawings and pointed out in the claims. It will be understood that the particular devices and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENTS

Figure 1:
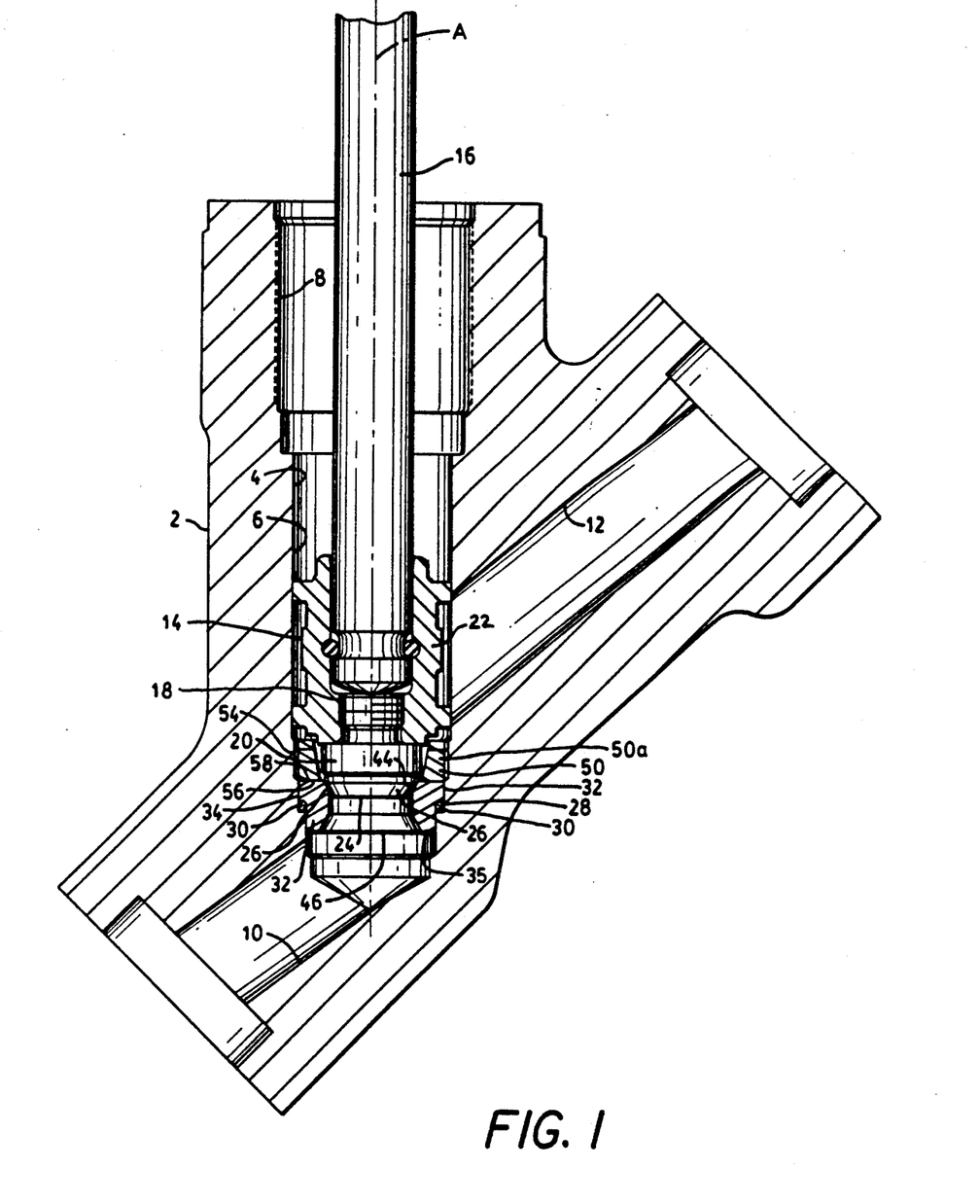
FIG. 1 is a sectional view of a valve illustrative of an embodiment of the invention, with some components shown in side elevation.

Referring to FIG. 1, it will be seen that an illustrative example of a valve in accordance with the invention includes a valve body 2 having a chamber 4 therein. An internal wall 6 of the chamber 4 is provided with threads 8 for receiving a bonnet (not shown) which closes an otherwise open end of the chamber 4. The body is further provided with inlet and outlet conduits, 10, 12, for conducting flow of fluid to and from, respectively, the chamber 4.

A valve stem 16 extends from outside the valve body 2 into the chamber 4. On the end of the valve stem 16 disposed within the chamber 4, there is mounted an upper disk member 14 which may be provided with threads 18 adapted to receive and retain a threaded lower disk member 20. Alternatively, the disk members 14, 20 may be, and often are, formed as a single unit, which is referred to as the "disk". Accordingly, hereinafter the disk member 14, 20 will be referred to as "the disk" and designated by the reference character 22.

A distal end 24 of the disk 22 is provided with an annular conical surface 26 which in lines downwardly and inwardly, as viewed in FIG. 1.

Disposed in the chamber 4, on a shelf-like surface 28, is a resilient ring 30, preferably of flexible graphite. The graphite is compressible in volume and, once compressed, seeks to return to its non-compressed state, such resilience providing the ring 30 with a spring-like facility. "Flexible graphite" is also referred to as "expanded graphite" as an "exfoliated graphite". It has been marketed under the trademark "Grafoil" by Union Carbide. In manufacture, substantially pure natural graphite is expanded (exfoliated) and converted by further processing into solid parts that have substantial bulk compressibility, a solid part, fully contained, can be compressed significantly and yet "spring back" to approach its previous volume. Further, the material has the thermal and chemical stability of graphite, which is advantageous in valve applications. Unlike many materials considered "resilient", flexible graphite does not fain its resilience through deformation in shape, as do, for example, elastomeric O-rings, but rather through bulk compressibility.

Seated, at least in part, upon the resilient ring 30 in the chamber 4 is an annular seat 32. In the embodiments shown in FIGS. 1 and 2, the seat 32 is generally cylindrically shaped and is provided with an outwardly extending flange 34 which is engaged with the resilient ring 30. When compressed, the ring 30 exercises an upward bias, as viewed in FIGS. 1 and 2, upon the flange 34, and thereby upon the seat 32.

Figure 2:
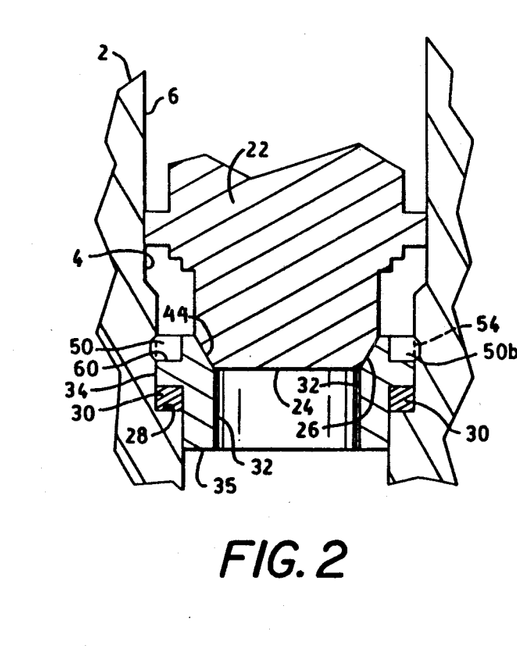
FIG. 2 is a sectional view of a valve portion, illustrative of an alternative embodiment of the invention.
Figure 3:
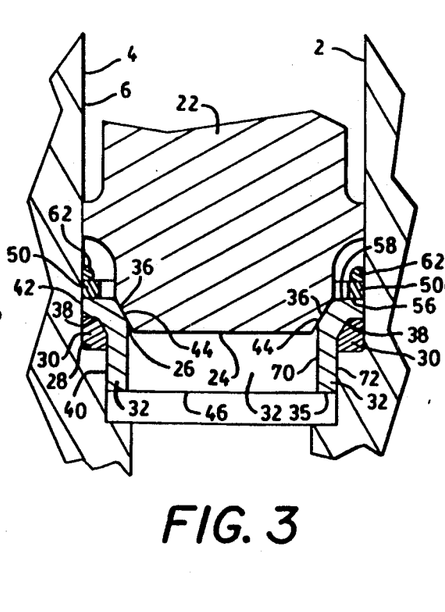
FIGS. 3 and 4 are sectional views of a valve portion, illustrative of further alternative embodiments of the invention.
Figure 4:
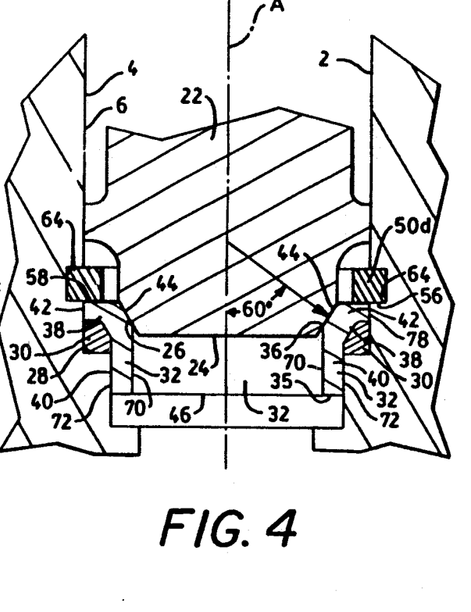
Figure 5:
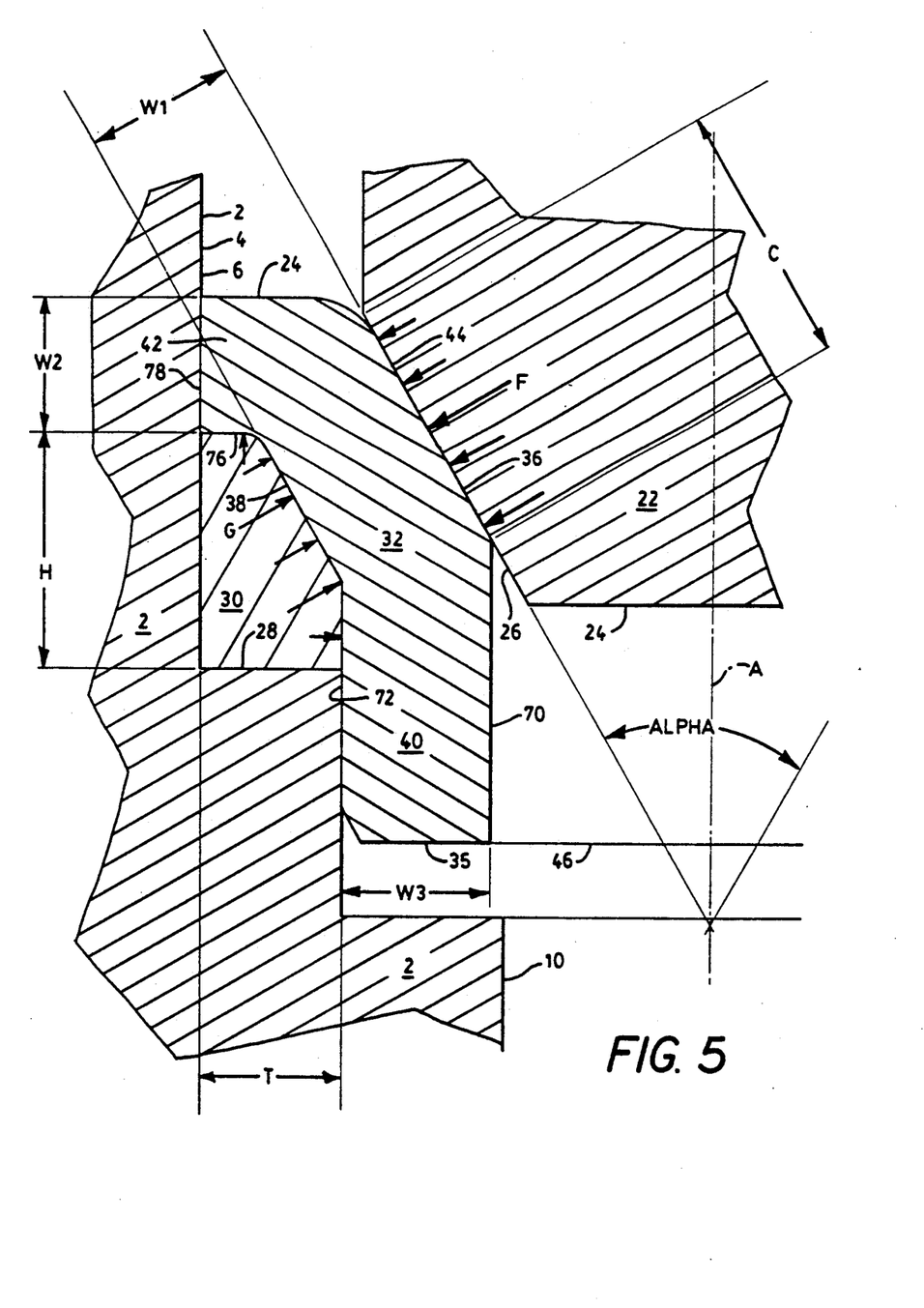
FIG. 5 is a diagrammatic representation of the valve portions shown in FIGS. 3 and 4.

The seat 32 is further provided with an annular surface 35 which is exposed to fluid in the chamber inlet conduit 10, the fluid exercising an upward bias on the seat, as the seat is illustrated in FIGS. 1 and 2. In FIGS. 3 and 4, the seat is shown in an alternative configuration, the seat comprising a ring of partly cylindrical and partly conical configuration, in vertical cross-section, as shown in FIGS. 3-5, with a conical inner wall 36 and outer wall 38 joined by cylindrical portions 40, 42. The conical outer wall 38 abuts the resilient ring 30 which, when compressed, exerts a bias upwardly, as viewed in FIGS. 3-5, and also exerts a bias radially inwardly, and in directions therebetween. As in the embodiments shown in FIGS. 1 and 2, in the embodiments of FIGS. 3 and 4, the annular seat 32 is arranged such that surfaces 35 are impinged upon by fluid in the inlet conduit 10. The seat 32 is therefore biased, by upstream fluid pressure acting upon the annular surface 35, toward engagement with the valve disk 22.

The seat 32 conical inner wall 36 provides a conical surface 44 which in lines inwardly toward the disk axis A and toward a distal end 46 of the seat. The conical surface 44 is complementary to, and adapted to engage with, the annular conical surface 26 of the disk.

A retainer ring 50 (FIG. 1) is fixed in the chamber 4, as by threads 54, and is adapted to be engaged by the annular seat 32 and serves to limit movement of the annular seat in the disk-engagement direction. As shown in FIG. 1, the retainer ring 50 may be a generally cylindrically-shaped annular ring 50a. The retainer ring 50a is provided with an annular surface 56 against which a surface 58 of the annular seat 32 may abut to stop movement of the seat 32.

The alteratively, the valve body chamber 4 may be adapted to threadedly receive a threaded retainer ring 50b (FIG. 2) which may be engaged by the seat surface 589 shown in FIG. 1, or may be engaged by a surface 60 of the seat flange 34, as shown in FIG. 2. In another embodiment, shown in FIG. 4, a retainer ring 50d may e retained in a groove 64 in the internal wall 6 of the chamber 4, the ring 50d extending from the groove 64 inwardly of the chamber 4. If replacement of the seat 32 is not of concern, the retainer ring 50c, shown in FIG. 3, may be held in place by spot welds 62. In all the embodiments illustrated, the retainer ring 50 serves to limit the movement of the seat 32 in the disk-engagement direction.

Thus, there is provided a seat which is biased by upstream pressure thereon, and by the resilience of the ring 30, toward engagement with the valve disk 22. The seat will maintain a sealing load with the disk even if there is moderate loss in the stem load because of thermal contraction or stem stress relaxation. It has been found in practice that the upstream pressure on the annular seat surface 35 provides good seat sealing performance even if the resilience of the ring 30 is lost because of abusive loading, or the like.

In addition to being "spring loaded" by the resilient ring 30, the seat 32 may, by virtue of being made separately from the valve body, be made of a harder, more erosion resistant material than can be used for a seat integral with the valve body. For example, a discrete seat insert formed independently of the valve body may be formed of stellite #3 which is much harder than stellite #21, typically used for integral seats. The harder material is more brittle and not practical for use as an integral seat. The formation of the integral seats with the body usually involves welding, and hard, brittle materials, such as stellite #3, tend to crack when welded.

The seat embodiment illustrated in FIGS. 3-5 features a relatively thin walled seat insert 32 which provides improved radial flexibility. In this embodiment, as illustrated in FIG. 4, the graphite resilient ring 30 is positioned centrally of a 60° angle from the axis A of the disk. This arrangement facilitates transfer of seat load, created by the disk surface 26 bearing against the seat surface 44, through the seat 32 and the resilient ring 30 to the valve body 2. The seat shown in FIGS. 3 and 4, being of thinner construction (W3 in FIG. 5), provides less interference with fluid flow therethrough than does the seat shown in FIGS. 1 and 2, which substantially reduces the inside diameter of the valve inlet.

The seat 32 is substantially "pressure neutral" in that, when the valve is closed, the force F (FIG. 5) exercised by the disc surface 26 on the seat surface 44 is substantially equal to the force G exercized by the ring 30 on the seat surface 38. It has been found that a preferred configuration of seat 32 and ring 30 provides a near-balance of radial pressures and loads, that is, approximately balances the load exerted by the disk 22 on the seat 32 with the reacting pressure loads from the compressed flexible graphite ring 30, as is shown in FIG. 5. In the conical portion of the seat 32, the inner and outer conical walls 36, 38 are concentric and define therebetween a width W1.

The cylindrical portion 40 of the seat 32 includes concentric inner and outer walls 70, 72, interconnected by the seat surface 35 and defining therebetween a width W3, and the cylindrical portion 42 includes upper and lower walls 74, 76 (FIG. 5) interconnected by a cylindrical surface 78 and defining therebetween a width W2. A hypothetical continuation of the disk annular surface 26 defines an angle alpha. When the valve is closed, the disk surface 26 engages the seat surface 44 throughout a seating contact width C.

In the aforementioned preferred configuration, the height H of the ring 30, divided by the thickness T of the ring 30 equals 1/tan (alpha /2), that is:

$H/T = 1/\tan(\text{alpha}/2)$

When alpha = 60°, H/T = 1.73

It is further preferred that each of W1, W2 and W3 be no more than C, that is, that each of the width dimensions for the seat 32 be equal to, or less than, the seating contact width C.

In operation, a handle, wheel, or the like, (not shown) fixed to the upper end of the valve stem is manipulated to cause axial movement of the valve stem 16, and thereby the disk 22. In the "open" position, the disk 22 is separated from the seat 32, to permit flow of fluid from the inlet conduit 10, through the chamber 4, and to the outlet conduit 12. When it is desired to stop the flow of fluid through the valve, the aforementioned handle is operated to cause the stem 16 to move axially inwardly of the valve chamber 4 to move the disk 22 toward the seat 32 until the disk surface 26 firmly engages the seat surface 44. Further closing of the valve causes compression of the ring 30. The stem load in a downward direction essentially balances the fluid pressure load on the seat and the pressure load of the resilient ring, seeking return to its non-compressed state. In due course, if there is thermal contraction of the stem, sufficient to cause the disk 22 to move upwardly from the seat 32, the ring 30 expanding toward its non-compressed state, moves the seat 32 with the disk, continuing the secure contact therewith, so that no flow occurs through the valve. The seat 32 is movable until it engages the retainer 50, which prevents further movement of the seat. At this point, the ring 30 will have regained the configuration it had before closure of the valve.

While the seat 32 is, by virtue of its manufacture, longer lived than the integral seats, it will in due course require replacement. Rather than replacement of the entire valve, the disk assembly, including the stem 16 and disk 22, is removed, and the seat assembly, including the retainer 50, the seat 32, and the resilient ring 30, is removed and replaced. While care is taken to place the new components in exactly the same locations and with the same dimensional interrelationships as the old, there is invariably some small difference. In typical replacement systems, such small differences can lead to diminution of sealing performance. However, in the valve disclosed herein, the "live loading" of the resilient ring 30 and the ability of the seat 32 to move, or "float" in the chamber 4 provides a degree of latitude in the placement of the sealing components, such that a secure and complete seal may be obtained in spite of dimensional positioning off by a few thousandths of an inch.

In the embodiment shown in FIG. 3, the facility for replacement is not contemplated, though it could be undertaken by machining away the welds 62 in the valve chamber.

The above-described valve may be made in the following manner: provide a valve body having an inlet conduit, a valve chamber, and an outlet conduit, the valve chamber having a shelf-like surface therein; place a resilient ring on the shelf-like surface; place the annular seat on the resilient ring with the seat contacting the internal wall of the chamber both upstream and downstream of the resilient ring, the seat having an annular conical surface inclining outwardly in a direction from upstream to downstream, the seat having a surface exposed to the inlet conduit, apply a load on the seat, and thereby the resilient ring, to move the seat upstream in the chamber and compress the resilient ring, fix a retainer in the chamber on the downstream side of the seat at a distance from the seat sufficient to permit the resilient ring to regain a majority of its non-compressed state before the seat moves into engagement with the retainer, insert through an open end of the chamber a disk and valve stem into the chamber, the disk having an annular conical surface engageable with the seat annular conical surface, and close off the chamber open end.

In the assembly of the valve, the step of applying a load to the seat, to move the seat upstream and compress the resilient ring, may be accomplished with a pre-load tool (not shown) which simply serves to hold the seat down while a retainer is fixed in the chamber downstream of the seat. By placing the retainer in a position which does not permit full expansion of the resilient ring, it is assured that there is always a "springiness" to the resilient ring, and therefore always a bias towards downstream, even after the seat has contacted the seat movement limiting retainer.

It is to be understood that the present invention is by no means limited to the particular construction herein disclosed and/or shown in the drawings, but also comprises any modifications or equivalents within the scope of the claims. For example, references herein to "upper" and "lower" are made with respect to the illustrative drawings. It is understood that the valves described herein may be oriented at any attitude.

Having thus described our invention, what we claim as new and desire to secure by Letters Patent of the United States is:

1. A globe valve comprising
   a valve body defining a chamber,
   a valve stem extending into said chamber,
   a disk attached to said valve stem at an end of said valve stem in said chamber,
   a discrete annular seat movably disposed in said chamber,
   a compressed resilient ring disposed in said chamber adjacent said annular seat, and
   a rigid metal retainer fixed in said chamber and extending inwardly from an internal wall of said chamber and on a side of said seat opposite from said resilient ring,
   wherein said resilient ring, seeking return to its non-compressed state, exercises a bias on said seat in a direction toward said disk, urging said seat into engagement with said disk.

2. The valve in accordance with claim 1 wherein said annular seat includes a surface exposed to fluid flowing to said valve, said seat being biased by pressure of said fluid in said direction toward said disk.

3. The valve in accordance with claim 2 wherein said annular seat surface is substantially normal to said fluid flow.

4. The valve in accordance with claim 1 wherein said disk is operable to engage said seat to close said valve, and to disengage from said seat to open said valve, and wherein upon movement of said disk in a valve opening direction, said movement of said disk is accompanied by movement of said seat to keep said valve closed, until said seat engages said retainer, said movement of said seat being caused at least in part by said resilient ring.

5. The valve in accordance with claim 4 wherein said disk includes a frusto-conically shaped portion wherein the surface of said portion inclines inwardly toward the axis of said disk and toward said end of said disk in said chamber, and said annular seat has an internal surface portion inclined to accept said disk frusto-conical portion, such that upon engagement of said disk and said seat, force exerted by said disk on said seat is transmitted from said seat to said body.

6. The valve in accordance with claim 5 wherein said disk surface portion and said seat surface portion are arranged to transmit said force at an included angle of about 60° from said disk axis through said seat to said body.

7. The valve in accordance with claim 5 wherein said disk frusto-conically shaped portion inclining surface and said annular seat inclined surface portion are complementary.

8. The valve in accordance with claim 5 wherein said annular seat is of a partially conical and partially cylindrical configuration in transfers section, having inner and outer concentric conical surfaces.

9. The valve in accordance with claim 8 wherein said ring has a heighth and a width, and said heighth is about 1.73 times said width.

10. The valve in accordance with claim 8 wherein said ring has a heighth H and a thickness T, and said disk frusto-conical portion, if hypothetically extended, defines an included angle alpha, and $H/T = 1/\tan(\alpha/2)$.

11. The valve in accordance with claim 10 wherein a width W1 is defined by said seat concentric conical surfaces, and said disk frusto-conical portion engages the inner of said seat conical surfaces throughout a contact width C, W1 being no more than C.

12. The valve in accordance with claim 11 wherein W1 is less than C.

13. The valve in accordance with claim 4 wherein said resilient ring is of flexible graphite.

14. The valve in accordance with claim 13 wherein said retainer comprises a retainer ring fixed to said internal wall of said chamber, said retainer ring being in position to be engaged by said seat and to stop movement of said seat.

15. The valve in accordance with claim 14 wherein said retainer ring is held in place in said chamber by weld means preventing movement of said retainer ring.

16. The valve in accordance with claim 14 wherein said retainer ring is disposed in an annular groove in said internal wall of said chamber and extends from said groove inwardly of said chamber.

17. The valve in accordance with claim 14 wherein said retainer comprises a collar member threadedly secured on said internal wall of said chamber.

18. The valve in accordance with claim 14 wherein the distance between said retainer and said seat is less than the distance require to permit said movement of said seat sufficient to permit the expansion of said resilient ring to a fully non-compressed state.

19. The valve in accordance with claim 13 wherein said seat is of a selected one of stellite #3 and ceramic material.

20. The valve in accordance with claim 1 wherein said annular seat includes inner and outer concentric conical surface and outwardly-facing cylindrical surfaces upstream and downstream, respectively, of said resilient ring.

21. A method for making a globe valve, said method comprising:
   providing a valve body having
      an inlet conduit,
      a valve chamber, and
      an outlet conduit,
      the valve chamber having a shelf-like surface therein;
   placing a resilient ring on said shelf-like surface;
   providing a discrete annular valve seat of hard erosion-resistant material,
   placing said annular seat on said resilient ring with said seat contacting an internal wall of said chamber both upstream and downstream of said resilient ring, said seat having an annular conical surface inclining outwardly in a direction from upstream to downstream, said seat having a surface exposed to said inlet conduit,
   applying a load on said seat, and thereby said resilient ring, to move said seat upstream in said chamber and compress said resilient ring,
   fixing a retainer in said chamber on the downstream side of said seat at a distance from said seat sufficient to permit said resilient ring to regain a substantial part of its non-compressed state before said seat moves into engagement with said retainer,
   inserting through an open end of said chamber a disk and valve stem into the chamber, said disk having an annular conical surface engageable with said seat annular conical surface, and
closing off said chamber open end.

22. The method in accordance with claim 21 wherein said ring is of flexible graphite.

23. The method in accordance with claim 21 wherein said seat annular conical surface and said disk annular conical surface are complementary.

24. The method in accordance with claim 21 wherein said annular seat is of a partly conical and partly cylindrical configuration in transverse section, having inner and outer concentric conical surfaces and outwardly-facing cylindrical surfaces of said seat contacting said chamber internal wall upstream and downstream, respectively, of said resilient ring.

* * * * *

UNITED STATES PATENT AND TRADEMARK OFFICE
CERTIFICATE OF CORRECTION

PATENT NO. : 5,288,054

DATED : February 22, 1994

INVENTOR(S) : Earl A. Bake, Leonard J. Stephens

It is certified that error appears in the above—identified patent and that said Letters Patent is hereby corrected as shown below:

Col. 1, line 19, after "F" delete "." ; line 20, after "F" delete "." ;

Col. 3, line 43, after "which" delete "in lines" and insert --inclines--; line 51, before "as" insert --and-- and after "as" delete "an"; line 56, before "solid" delete ", a" and insert --. A--; line 62, before "its" delete "fain" and insert --gain--;

Col. 4, line 25, after "which" delete "in lines" and insert --inclines--; line 38, before "the" delete "The alteratively" and insert --Alternatively--; line 44, before "retained" delete "e" and insert --be--;

Col. 7, line 60, before "section" delete "transfers" and insert --transverse--;

UNITED STATES PATENT AND TRADEMARK OFFICE
CERTIFICATE OF CORRECTION

PATENT NO. : 5,288,054
DATED : Feb. 22, 1994
INVENTOR(S) : Earl A. Bake, Leonard J. Stephens It is certified that error appears in the above-indentified patent and that said Letters Patent is hereby corrected as shown below:

Col. 8, line 30, before "to" delete "require" and insert --required--; line 38, before "and" delete "surface" and insert --surfaces--.

Signed and Sealed this

Sixteenth Day of August, 1994

Attest:

BRUCE LEHMAN

Attesting Officer     Commissioner of Patents and Trademarks